United States Patent
Ku et al.

(10) Patent No.: US 10,972,169 B2
(45) Date of Patent: Apr. 6, 2021

(54) METHOD FOR FEEDBACK OF CHANNEL QUALITY INFORMATION IN WIRELESS COMMUNICATION SYSTEM, AND DEVICE FOR SAME

(71) Applicant: LG ELECTRONICS INC., Seoul (KR)

(72) Inventors: Gwanmo Ku, Seoul (KR); Haewook Park, Seoul (KR); Kilbom Lee, Seoul (KR); Sangrim Lee, Seoul (KR); Woonghee Lee, Seoul (KR); Hojae Lee, Seoul (KR); Hyukjin Chae, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/761,588

(22) PCT Filed: Nov. 5, 2018

(86) PCT No.: PCT/KR2018/013304
§ 371 (c)(1),
(2) Date: May 5, 2020

(87) PCT Pub. No.: WO2019/088780
PCT Pub. Date: May 9, 2019

(65) Prior Publication Data
US 2020/0274601 A1    Aug. 27, 2020

Related U.S. Application Data

(60) Provisional application No. 62/582,244, filed on Nov. 6, 2017.

(51) Int. Cl.
*H04B 7/06*    (2006.01)
*H04B 17/327*    (2015.01)
(Continued)

(52) U.S. Cl.
CPC ......... *H04B 7/0632* (2013.01); *H04B 17/327* (2015.01); *H04B 17/336* (2015.01); *H04L 5/0023* (2013.01)

(58) Field of Classification Search
CPC .. H04B 7/0632; H04B 17/327; H04B 17/336; H04L 5/0023
See application file for complete search history.

(56) References Cited

U.S. PATENT DOCUMENTS 7,986,715 B2*    7/2011   Song ................. H04N 21/4381
                                                                    370/470
8,265,868 B2*    9/2012   Cho .......................... G08G 1/092
                                                                    701/414
(Continued)

FOREIGN PATENT DOCUMENTS

KR    10-2013-0103449 A    9/2013
WO   WO 2017/023230 A1   2/2017

OTHER PUBLICATIONS

M. Cho, Y. Kim, J. Lee and D. Hong, "A CQI Feedback Reduction Scheme for Multi-User MIMO/OFDMA Systems," 2007 IEEE 18th International Symposium on Personal, Indoor and Mobile Radio Communications, Athens, 2007, pp. 1-7, doi: 10.1109/PIMRC.2007.4394344. (Year: 2007).*

*Primary Examiner* — James M Perez
(74) *Attorney, Agent, or Firm* — Birch, Stewart, Kolasch & Birch, LLP

(57) ABSTRACT

The method for feedback of channel quality information in a wireless communication system, according to one embodiment of the present invention, is performed by a terminal and comprises the steps of: receiving feedback configuration information, including information on disjoint segmentation indicating the indexes of channel or beam quality-related parameters for broadcast or multicast services, from a base station; and according to the information on disjoint seg-
(Continued)

mentation in the feedback configuration information, encoding the index of a channel or beam quality-related parameter to be reported and transmitting same to the base station, wherein the disjoint segmentation includes multiple subsets which do not overlap and which have different lengths, and the index of the channel or beam quality-related parameter, which is transmitted to the base station, may indicate a predetermined value in one subset among the multiple subsets.

13 Claims, 14 Drawing Sheets

(51) Int. Cl.
*H04B 17/336* (2015.01)
*H04L 5/00* (2006.01)

(56) References Cited

U.S. PATENT DOCUMENTS

| | | | | |
|---|---|---|---|---|
| 8,797,989 | B2* | 8/2014 | Lee | H04W 74/0841 370/329 |
| 9,025,574 | B2* | 5/2015 | Ebrahimi Tazeh Mahalleh | H04L 25/03955 370/336 |
| 9,031,569 | B2* | 5/2015 | Kwon | H04W 48/18 455/454 |
| 9,692,580 | B2* | 6/2017 | Shen | H04L 5/0048 |
| 10,164,747 | B2* | 12/2018 | Onggosanusi | H04B 7/0469 |
| 10,582,405 | B2* | 3/2020 | Yum | H04B 7/0456 |
| 2002/0015420 | A1* | 2/2002 | Yoon | H04L 1/0071 370/468 |
| 2009/0275352 | A1* | 11/2009 | Kim | H04B 7/0671 455/509 |
| 2010/0322176 | A1* | 12/2010 | Chen | H04L 5/0057 370/329 |
| 2011/0019694 | A1* | 1/2011 | Kwon | H04L 27/2613 370/474 |
| 2012/0257605 | A1* | 10/2012 | Abraham | H04L 5/0094 370/338 |
| 2013/0039349 | A1* | 2/2013 | Ebrahimi Tazeh Mahalleh | H04B 7/024 370/336 |
| 2013/0064276 | A1* | 3/2013 | Kim | H04B 7/0417 375/219 |
| 2013/0078913 | A1* | 3/2013 | Lee | H04W 52/146 455/39 |
| 2013/0107704 | A1* | 5/2013 | Dinan | H04W 72/042 370/230 |
| 2013/0235742 | A1* | 9/2013 | Josiam | H04B 7/0695 370/252 |
| 2013/0301467 | A1* | 11/2013 | Kang | H04B 7/024 370/252 |
| 2014/0348078 | A1* | 11/2014 | Kim | H04W 72/0473 370/329 |
| 2015/0049689 | A1* | 2/2015 | Seo | H04L 5/0073 370/329 |
| 2015/0189667 | A1* | 7/2015 | Yum | H04W 4/06 370/312 |
| 2015/0358062 | A1* | 12/2015 | Skillermark | H04L 1/0026 370/329 |
| 2016/0006549 | A1* | 1/2016 | Kim | H04B 17/318 370/252 |
| 2016/0119910 | A1* | 4/2016 | Krzymien | H04L 5/0023 370/329 |
| 2016/0165466 | A1* | 6/2016 | Kim | H04L 5/0057 370/252 |
| 2016/0337105 | A1* | 11/2016 | Lawton | H04L 1/0026 |
| 2016/0359538 | A1* | 12/2016 | Onggosanusi | H04L 5/0057 |
| 2017/0054542 | A1* | 2/2017 | Vermani | H04B 7/0643 |
| 2017/0302353 | A1* | 10/2017 | Rahman | H04B 7/0486 |
| 2018/0102817 | A1* | 4/2018 | Park | H04B 7/04 |
| 2018/0132227 | A1* | 5/2018 | Ghosh | H04B 7/024 |
| 2018/0220399 | A1* | 8/2018 | Davydov | H04B 7/0626 |
| 2019/0124534 | A1* | 4/2019 | Yum | H04B 7/063 |
| 2020/0042609 | A1* | 2/2020 | Huang | G06F 16/24554 |
| 2020/0274601 | A1* | 8/2020 | Ku | H04L 1/06 |
| 2020/0336196 | A1* | 10/2020 | Ku | H04B 7/0632 |

* cited by examiner

FIG. 15

(a) 4-bit bitmap for eMBB upto 64QAM (b) 4-bit bitmap for eMBB upto 64QAM (modulation order)

(c) 4-bit bitmap for eMBB upto 256QAM (d) 5-bit bitmap for eMBB upto 256QAM (modulation order)

(e) 3-bit bitmap for MTC (f) 3-bit bitmap for MTC (modulation order)

METHOD FOR FEEDBACK OF CHANNEL QUALITY INFORMATION IN WIRELESS COMMUNICATION SYSTEM, AND DEVICE FOR SAME

CROSS REFERENCE TO RELATED APPLICATIONS

This application is the National Phase of PCT/KR2018/013304 filed on Nov. 5, 2018, which claims priority under 35 U.S.C. § 119(e) to U.S. Provisional Application No. 62/582,244 filed on Nov. 6, 2017, all of these applications are hereby expressly incorporated by reference into the present application.

TECHNICAL FIELD

The present disclosure relates to a wireless communication system, and more particularly, to a method for feedback of channel quality information and a device for the same.

BACKGROUND ART

As more communication devices require greater communication traffic, necessity for a mobile broadband communication, which is enhanced compared to a legacy radio access technology (RAT), is emerging. Massive MTC (machine type communication) providing a user with various services anywhere and at any time by connecting many devices and objects is one of important issues to be considered in the next generation communication system. Moreover, discussion on designing a communication system in consideration of a service sensitive to reliability and latency is in progress. In particular, discussion on the introduction of a next generation RAT considering eMBB (enhanced mobile broadband communication), massive MTC (mMTC), URLLC (ultra-reliable and low latency communication), and the like is in progress. In the present disclosure, for clarity, the next generation RAT is referred to as a New RAT.

DISCLOSURE

Technical Problem

The present disclosure is directed to providing a method for feedback of channel quality information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for feedback of channel quality information in a wireless communication system may be performed by a terminal and include receiving, from a base station, feedback configuration information including information on disjoint segmentation for an index of a parameter related to channel or beam quality for a broadcast or multicast service, and transmitting, to the base station, by encoding an index of a parameter related to channel or beam quality to be reported, according to the information on the disjoint segmentation in the feedback configuration information, wherein the disjoint segmentation comprises a plurality of subsets having different lengths while not overlapping with each other, and the index of the parameter related to the channel or the beam quality transmitted to the base station indicates a specific value in one of the plurality of subsets.

Additionally or alternatively, an index of a parameter related to channel or beam quality for each of the plurality of subsets is represented by a different number of bits.

Additionally or alternatively, the number of bits indicating the encoded index is smaller than the number of bits for indicating all indexes of a parameter related to channel or beam quality.

In another aspect of the present disclosure, a method for feedback of channel quality information in a wireless communication system may be performed by a base station and include transmitting, to a terminal, feedback configuration information including information on disjoint segmentation for an index of a parameter related to channel or beam quality for a broadcast or multicast service, and receiving, from the terminal, an index of a parameter related to channel or beam quality encoded according to the information on the disjoint segmentation in the feedback configuration information, wherein the disjoint segmentation comprises a plurality of subsets having different lengths while not overlapping with each other, and the index of the parameter related to the channel or the beam quality transmitted to the base station indicates a specific value in one of the plurality of subsets.

Additionally or alternatively, an index of a parameter related to channel or beam quality for each of the plurality of subsets is represented by a different number of bits.

Additionally or alternatively, the number of bits indicating the encoded index is smaller than the number of bits for indicating all indexes of a parameter related to channel or beam quality.

In another aspect of the present disclosure, a terminal for feedback of channel quality information in a wireless communication system may include a transmitter and a receiver, and a processor configured to control the transmitter and receiver, wherein the processor is configured to receive, from a base station, feedback configuration information including information on disjoint segmentation for an index of a parameter related to channel or beam quality for a broadcast or multicast service, and transmit, to the base station, by encoding an index of a parameter related to channel or beam quality to be reported, according to the information on the disjoint segmentation in the feedback configuration information, wherein the disjoint segmentation comprises a plurality of subsets having different lengths while not overlapping with each other, and the index of the parameter related to the channel or the beam quality transmitted to the base station indicates a specific value in one of the plurality of subsets.

Additionally or alternatively, an index of a parameter related to channel or beam quality for each of the plurality of subsets is represented by a different number of bits.

Additionally or alternatively, the number of bits indicating the encoded index is smaller than the number of bits for indicating all indexes of a parameter related to channel or beam quality.

In another aspect of the present disclosure, a base station for feedback of channel quality information in a wireless communication system may include a transmitter and a receiver, and a processor configured to control the transmitter and receiver, wherein the processor is configured to transmit, to a terminal, feedback configuration information including information on disjoint segmentation for an index of a parameter related to channel or beam quality for a broadcast or multicast service, and receive, from the terminal, an index of a parameter related to channel or beam quality encoded according to the information on the disjoint segmentation in the feedback configuration information, wherein the disjoint segmentation comprises a plurality of subsets having different lengths while not overlapping with each other, and the index of the parameter related to the channel or the beam quality transmitted to the base station indicates a specific value in one of the plurality of subsets.

Additionally or alternatively, an index of a parameter related to channel or beam quality for each of the plurality of subsets is represented by a different number of bits.

Additionally or alternatively, the number of bits indicating the encoded index is smaller than the number of bits for indicating all indexes of a parameter related to channel or beam quality.

The above technical solutions are merely some parts of the examples of the present disclosure and various examples into which the technical features of the present disclosure are incorporated can be derived and understood by persons skilled in the art from the following detailed description of the present disclosure.

Advantageous Effects

According to examples of the present disclosure, channel state measurement and reporting may be efficiently processed.

The above technical solutions are merely some parts of the examples of the present disclosure and various examples into which the technical features of the present disclosure are incorporated can be derived and understood by persons skilled in the art from the following detailed description of the present disclosure.

DESCRIPTION OF DRAWINGS

The accompanying drawings, which are included to provide a further understanding of the disclosure, illustrate examples of the disclosure and together with the description serve to explain the principle of the disclosure.

FIG. 15 shows various CQI index groups.

BEST MODE

Figure 1:
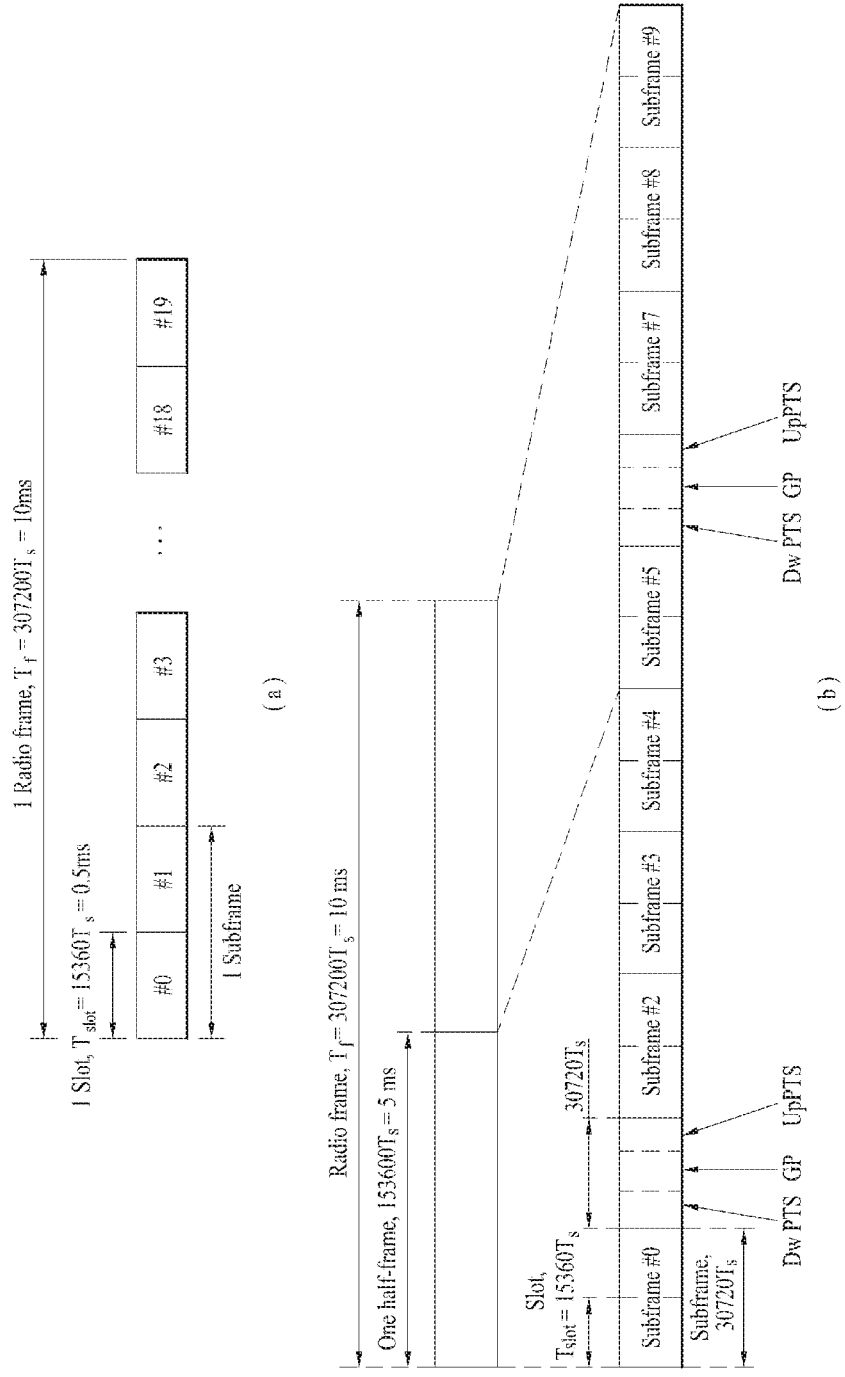
FIG. 1 illustrates the structure of a radio frame used in a wireless communication system.

Reference will now be made in detail to the exemplary examples of the present disclosure, examples of which are illustrated in the accompanying drawings. The detailed description, which will be given below with reference to the accompanying drawings, is intended to explain exemplary examples of the present disclosure, rather than to show the only examples that can be implemented according to the disclosure. The following detailed description includes specific details in order to provide a thorough understanding of the present disclosure. However, it will be apparent to those skilled in the art that the present disclosure may be practiced without such specific details.

In some instances, known structures and devices are omitted or are shown in block diagram form, focusing on important features of the structures and devices, so as not to obscure the concept of the present disclosure. The same reference numbers will be used throughout this specification to refer to the same or like parts.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present disclosure, a BS will be referred to as an eNB.

In the present disclosure, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna. A node is also referred to as a point. Compared to a conventional centralized antenna system (CAS) (i.e., a single-node system) in which antennas are concentrated in an eNB and controlled by one eNB controller, a plurality of nodes are generally located apart from each other by a predetermined distance or larger in a multi-node system. The plurality of nodes may be managed by one or more eNBs or eNB controllers which schedule data to be transmitted/received through each node. Each node may be connected to an eNB or eNB controller managing the node by cable or a dedicated line. In the multi-node system, the same or different cell identifies (IDs) may be used for signal transmission/reception to/from the plurality of nodes. If the plurality of nodes has the same cell ID, each of the nodes operates as a set of some antennas in one cell. If the nodes have different cell IDs in the multi-node system, this multi-node system may be regarded as a multi-cell (e.g., macro-cell/pemto-cell/pico-cell) system. If multiple cells formed by the plurality of nodes, respectively are overlaid with each other according to their coverages, a network constructed with the multiple cells is called a multi-tier network. The cell ID of an RRH/RRU and the cell ID of an eNB may be the same or different. If the RRH/RRU and the eNB use different cell IDs, both of the RRH/RRU and the eNB operate as independent BSs.

In a multi-node system of the present disclosure as described below, one or more eNBs or eNB controllers connected to a plurality of nodes may control the nodes to enable all or a part of the nodes to simultaneously transmit or receive signals to and from a UE. Although there are differences between multi-node systems in terms of the entity and implementation of each node, the multi-node systems are also different from a single-node system (e.g., a CAS, a legacy MIMO system, a legacy relay system, a legacy repeater system, or the like) in that a plurality of nodes participate together in providing a communication service to a UE in predetermined time-frequency resources. Accordingly, examples of the present disclosure pertaining to a method of performing data cooperative transmission by means of all or a part of a plurality of nodes are applicable to various types of multi-node systems. For example, while a node generally refers to an antenna group apart from another node by a predetermined distance or larger, the following examples of the present disclosure are also applicable even when a node refers to any antenna group irrespective of the distance between nodes. For example, for an eNB including X-pol (cross-polarized) antennas, the examples of the present disclosure may be applied with the appreciation that the eNB controls a node with H-pol antennas and a node with V-pol antennas.

A communication technique in which signals are transmitted/received through a plurality of transmission (Tx)/reception (Rx) nodes, signals are transmitted/received through at least one node selected from a plurality of Tx/Rx nodes, or a node transmitting a DL signal is different from a node receiving a UL signal is called multi-eNB MIMO or coordinated multi-point Tx/Rx (CoMP). Among these schemes for cooperative communication between nodes, cooperative transmission schemes are largely classified into joint processing (JP) and scheduling coordination. JP may further be classified into joint transmission (JT)/joint reception (JR) and dynamic point selection (DPS), whereas scheduling coordination may further be classified into coordinated scheduling (CS) and coordinated beamforming (CB). DPS is also referred to as dynamic cell selection (DCS). Compared to the cooperative communication schemes, when JP is performed among cooperative communication schemes between nodes, various communication environments may be formed. Among the JP schemes, a plurality of nodes transmits the same streams to a UE in JT, and a plurality of nodes receive the same stream from a UE in JR. The UE/eNB recovers the stream by combining the received signals. In view of transmission of the same stream from/to a plurality of nodes in JT/JR, the reliability of signal transmission may be increased by transmit diversity. Among the JP schemes, DPS is a communication scheme in which a signal is transmitted/received through a node selected from among a plurality of nodes according to a specific rule. Because a node in a good channel state for a UE is generally selected, DPS may increase the reliability of signal transmission.

In the present disclosure, a cell refers to a prescribed geographical area to which one or more nodes provide a communication service. Accordingly, in the present disclosure, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using channel state information reference signal(s) (CSI-RS(s)) transmitted on a CSI-RS resource, allocated by antenna port(s) of the specific node to the specific node. In general, adjacent nodes transmit CSI-RSs in mutually orthogonal CSI-RS resources. When it is said that CSI-RS resources are orthogonal, the CSI resources are different in terms of at least one of a CSI-RS resource configuration which specifies a symbol and a subcarrier carrying a CSI-RS, a subframe configuration which specifies a subframe to which a CSI-RS is allocated by a subframe offset and a transmission period, or a CSI-RS sequence.

In the present disclosure, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present disclosure, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present disclosure, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system. Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 Ts) in duration. The radio frame is divided into 10 subframes of equal size. Subframe numbers may be assigned to the 10 subframes within one radio frame, respectively. Here, Ts denotes sampling time where Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

Figure 2:
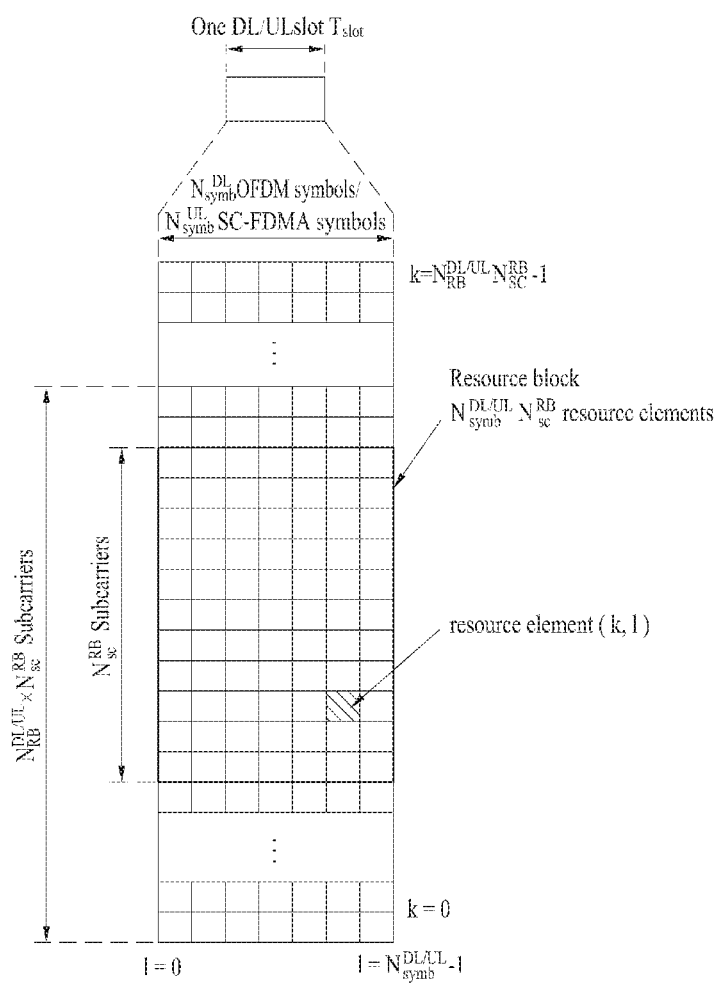
FIG. 2 illustrates the structure of a downlink (DL)/uplink (UL) slot in a wireless communication system.

FIG. 2 illustrates the structure of a DL/UL slot structure in a wireless communication system. Particularly, FIG. 2 illustrates the structure of a resource grid in the 3GPP LTE/LTE-A system. There is on resource grid per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including NDL/ULRB*NRBsc subcarriers and NDL/ULsymb OFDM symbols. NDLRB denotes the number of RBs in a DL slot and NULRB denotes the number of RBs in a UL slot. NDLRB and NULRB depend on a DL transmission bandwidth and a UL transmission bandwidth, respectively. NDLsymb denotes the number of OFDM symbols in a DL slot, NULsymb denotes the number of OFDM symbols in a UL slot, and NRBsc denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present disclosure are similarly applicable to subframes having a different number of OFDM symbols. Referring to FIG. 2, each OFDM symbol includes NDL/ULRB*NRBsc subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency fc.

One RB is defined as NDL/ULsymb (e.g. 7) consecutive OFDM symbols in the time domain and as NRBsc (e.g. 12) consecutive subcarriers in the frequency domain. For reference, a resource composed of one OFDM symbol and one subcarrier is referred to a resource element (RE) or tone. Accordingly, one RB includes NDL/ULsymb*NRBsc REs.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Each RE within a resource grid may be uniquely defined by an index pair (k, l) within one slot. k is an index ranging from 0 to NDL/ULRB*NRBsc−1 in the frequency domain, and l is an index ranging from 0 to NDL/ULsymb−1 in the time domain.

Two RBs each being located in one of two slots in a subframe, occupying the same NRBsc consecutive subcarriers are referred to as a physical resource block (PRB) pair. The two RBs of a PRB pair have the same PRB number (or PRB index). A virtual resource block (VRB) is a kind of logical resource allocation unit introduced for resource allocation. A VRB is of the same size as a PRB. VRBs are categorized into localized VRBs and distributed VRBs depending on how VRBs are mapped to PRBs. The localized VRBs are mapped directly to PRBs, and thus VRB numbers (or VRB indexes) correspond directly to PRB numbers. That is, nPRB=nVRB. The localized VRBs are indexed as 0 to NDLVRB−1, and NDLVRB=NDLRB. Accordingly, VRBs of the same VRB number are mapped to PRBs of the same PRB number in the first and second slots in the localized mapping scheme. In contrast, distributed VRBs are mapped to PRBs after interleaving. Accordingly, distributed VRBs of the same VRB number may be mapped to PRBs of different numbers in the first and second slots. Two PRBs of the same VRB number, each being located in one of two slots in a subframe are referred to as a VRB pair.

Figure 3:
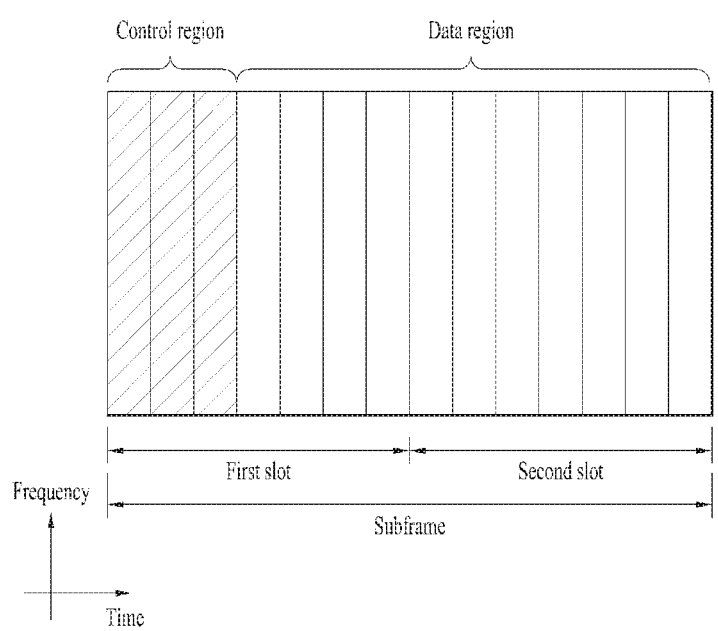
FIG. 3 illustrates the structure of a DL subframe used in a 3rd generation partnership project long term evolution (3GPP LTE)/LTE-advanced (LTE-A) system.

FIG. 3 illustrates the structure of a DL subframe used in the 3GPP LTE/LTE-A system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. For example, the DCI includes a transmission format and resource allocation information for a downlink shared channel (DL-SCH), a transmission format and resource allocation information for an uplink shared channel (UL-SCH), paging information of a paging channel (PCH), system information of the DL-SCH, resource allocation information for an upper-layer control message such as a random access response transmitted on a PDSCH, a transmit power control command set for individual UEs of a UE group, a transmit power control command, indication information for activation of voice over IP (VoIP), a downlink assignment index (DAI), and so on. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to 9 REGs, and one REG corresponds to four REs. In a 3GPP LTE system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. In the 3GPP LTE/LTE-A system, SSs for respective DCI formats may have different sizes, and a dedicated SS and a common SS are defined. The dedicated SS is a UE-specific SS (USS) and is configured for each individual UE. The common SS (CSS) is configured for a plurality of UEs. In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S(L)k$ at aggregation level $L \in \{1, 2, 4, 8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

TABLE 3

| Type | Search Space $S_K^{(L)}$ Aggregation Level L | Size[in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

TABLE 3-continued

| Type | Search Space $S_k^{(L)}$ Aggregation Level L | Size[in CCEs] | Number of PDCCH candidates $M^{(L)}$ |
|---|---|---|---|
| Common | 4 | 16 | 4 |
|  | 8 | 16 | 2 |

One PDCCH candidate corresponds to 1, 2, 4, or 8 CCEs according to a CCE aggregation level. An eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

The eNB may transmit data to a UE or UE group in a data region. Data transmitted in the data region is referred to as user data. For transmission of user data, a physical downlink shared channel (PDSCH) may be allocated in the data region. A paging channel (PCH) and a DL-SCH are transmitted on the PDSCH. A UE may read data transmitted on a PDSCH by decoding control information transmitted on a PDCCH. Information regarding a UE or UE group to which data of the PDSCH is transmitted, and information regarding how the UE or UE group should receive and decode the PDSCH data may be transmitted on the PDCCH. For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

To demodulate a signal received from the eNB, the UE needs a reference signal (RS) to be compared with a data signal. An RS is a signal in a predefined special waveform, which the eNB or the UE transmits to the UE or the eNB or which is known to both of the eNB and the UE. The RS is also called a pilot. RSs are classified into cell-specific RS (CRS) common to all UEs within a cell and demodulated RS (DM RS) dedicated to a specific UE. A DM RS that the eNB transmits for demodulation of DL data at a specific UE is specially called a UE-specific RS. Only one or both of the DM RS and the CRS may be transmitted on DL. However, when only the DM RS without the CRS is transmitted on the DL, the DM RS to which the same precoder as that for data is applied may be used only for demodulation. Therefore, an RS for channel measurement should be provided separately. For example, an additional measurement RS, CSI-RS is transmitted to the UE to enable the UE to measure channel state information (CSI) in 3GPP LTE(-A). Compared to the CRS transmitted in each subframe, the CSI-RS is transmitted in every predetermined transmission period including a plurality of subframes, based on the property that a channel state does not change relatively much over time.

Figure 4:
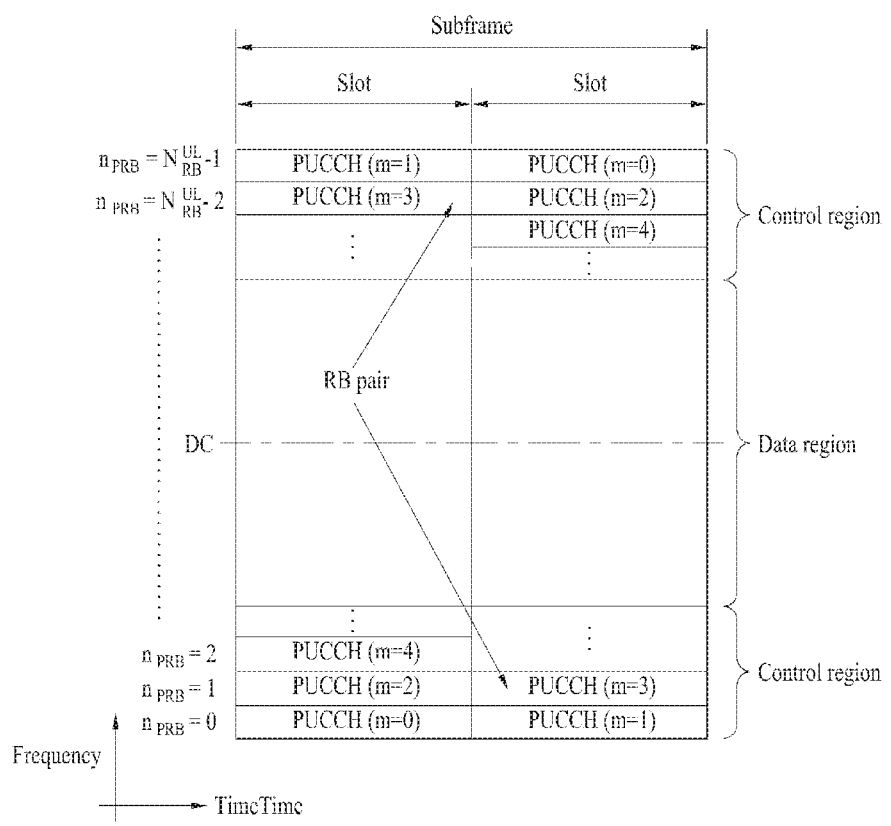
FIG. 4 illustrates the structure of a UL subframe used in the 3GPP LTE/LTE-A system.

FIG. 4 illustrates the structure of a UL subframe used in the 3GPP LTE/LTE-A system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. In the CSI, multiple input multiple output (MIMO) related feedback information includes the rank indicator (RI) and the precoding matrix indicator (PMI).

The amount of uplink control information (UCI) that the UE may transmit in a subframe depends on the number of SC-FDMA symbols available for transmission of control information. The SC-FDMA symbols available for the UCI refer to the remaining SC-FDMA symbols except for SC-FDMA symbols used for RS transmission in an SC-FDMA subframe, and also except for the last SC-FDMA symbol in a subframe with a sounding reference signal (SRS). The RS is used for coherent detection of a PUCCH. The PUCCH supports various formats according to the amount of transmitted information.

Table 4 illustrates mapping relationships between PUCCH formats and UCI in the LTE/LTE-A system.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |

TABLE 4-continued

| PUCCH format | Modulation scheme | Number of bits per subframe | Usage | Etc. |
|---|---|---|---|---|
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, the PUCCH format 1 series are mainly used to deliver ACK/NACK information, the PUCCH format 2 series are mainly used to deliver channel state information (CSI) such as CQI/PMI/RI, and the PUCCH format 3 series are mainly used to deliver ACK/NACK information.

Reference Signal (RS)

When a packet is transmitted in a wireless communication system, the signal may be distorted during transmission because the packet is transmitted on a radio channel. To correctly receive the distorted signal, a receiver should compensate the received signal for the distortion based on channel information. Typically, a signal known to both the transmitter and the receiver is transmitted, and the channel information is obtained based on how much the signal is distorted during reception on the radio channel. This signal is called a pilot signal or a reference signal (RS).

When data is transmitted and received through multiple antennas, knowledge of the channel state between each transmission antenna and each reception antenna is required to receive a correct signal. Therefore, an RS should exist for each individual transmission antenna and more specifically for each individual antenna port.

RSs may be classified into UL RSs and DL RSs. In the current LTE system, the following UL RSs are defined.

i) Demodulation reference signal (DM-RS) for channel estimation for coherent demodulation of information transmitted over a PUSCH and a PUCCH ii) Sounding reference signal (SRS) in which an eNB measures UL channel quality in different frequencies.

The following DL RSs are defined.

i) Cell-specific reference signal (CRS) shared by all UEs within a cell.

ii) UE-specific reference signal dedicated to a specific UE.

iii) DM-RS transmitted for coherent demodulation, when a PDSCH is transmitted.

iv) Channel state information reference signal (CSI-RS) for delivering CSI, when DL DMRS is transmitted.

v) Multimedia broadcast single frequency network (MBSFN) RS transmitted for coherent demodulation of a signal transmitted in an MBSFN mode.

vi) Positioning reference signal used to estimate information about the geographical location of a UE.

RSs may be classified into two types according to their purposes: RS for obtaining channel information and RS for data demodulation. Because the former is used for a UE to acquire DL channel information, it should be transmitted over a wide band and received even at a UE which does not receive DL data in a specific subframe. The former is also used in a situation such as handover. The latter is an RS that an eNB transmits together with DL data in a corresponding resource, and a UE may demodulate data by receiving the RS and performing channel measurement. This RS should be transmitted in an area in which data is transmitted.

New Radio Technology (NR)

Hereinafter, a new radio access technology system will be described. As more communication devices require a larger communication capacity, a need for mobile broadband communication improved compared to the conventional radio access technology (RAT) has emerged. Massive Machine Type Communications (MTC), which provides various services anytime, anywhere by connecting multiple devices and objects, is also needed. In addition, a design of a communication system considering a service/UE sensitive to reliability and latency has been proposed.

A new wireless access technology system has been proposed as a new wireless access technology in consideration of enhanced mobile broadband communication, massive MTC, and ultra-reliable and low latency communication (URLLC). Hereinafter, in the present disclosure, for simplicity, this technology is referred to as New RAT or NR (New Radio).

The NR system to which the present disclosure is applicable supports various OFDM numerologies as shown in the table below. Here, $\mu$ and cyclic prefix information on each carrier bandwidth part may be signaled for each DL or UL. For example, $\mu$ and cyclic prefix information for a downlink carrier bandwidth part may be signaled through higher layer signaling DL-BWP-mu and DL-MWP-cp. As another example, $\mu$ and cyclic prefix information for an uplink carrier bandwidth part may be signaled through higher layer signaling UL-BWP-mu and UL-MWP-cp.

TABLE 5

| $\mu$ | $\Delta f\, 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In the case of the frame structure in NR, downlink and uplink transmissions are configured in a 10 ms frame. A frame may be composed of 10 subframes each having a length of 1 ms. Here, the number of consecutive OFDM symbols for each subframe is $$N_{symb}^{subframe,\mu} = N_{symb}^{slot} N_{slot}^{subframe,\mu}.$$

Each frame may be composed of two half-frames having the same size. Here, the half-frames may be composed of subframes 0 to 4 and subframes 5 to 9, respectively.

For subcarrier spacing slots may be numbered in ascending order as $$n_s^\mu \in \{0, \ldots, N_{slot}^{subframe,\mu} - 1\}$$

in one subframe and may be numbered in ascending order as $$n_{s,f}^\mu \in \{0, \ldots, N_{slot}^{frame,\mu} - 1\}$$

in one frame. Here, the number of consecutive OFDM symbols in one slot, $$N_{symb}^{slot},$$

may be determined according to the cyclic prefix as shown in the table below. The starting slot $$n_s^\mu$$

in one subframe is aligned in time with the starting OFDM symbol $$n_s^\mu N_{symb}^{slot}$$

in the same subframe. Table 4 below shows the number of OFDM symbols per slot/frame/subframe for a normal cyclic prefix, and Table 5 shows the number of OFDM symbols per slot/frame/subframe for an extended cyclic prefix.

TABLE 6

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 6 |
| 5 | 14 | 320 | 32 |

TABLE 7

| μ | $N_{symb}^{slot}$ | $N_{slot}^{frame, \mu}$ | $N_{slot}^{subframe, \mu}$ |
|---|---|---|---|
| 2 | 12 | 40 | 4 |

In an NR system to which the present disclosure is applicable, a self-contained slot structure may be applied as a slot structure as described above.

Figure 5:
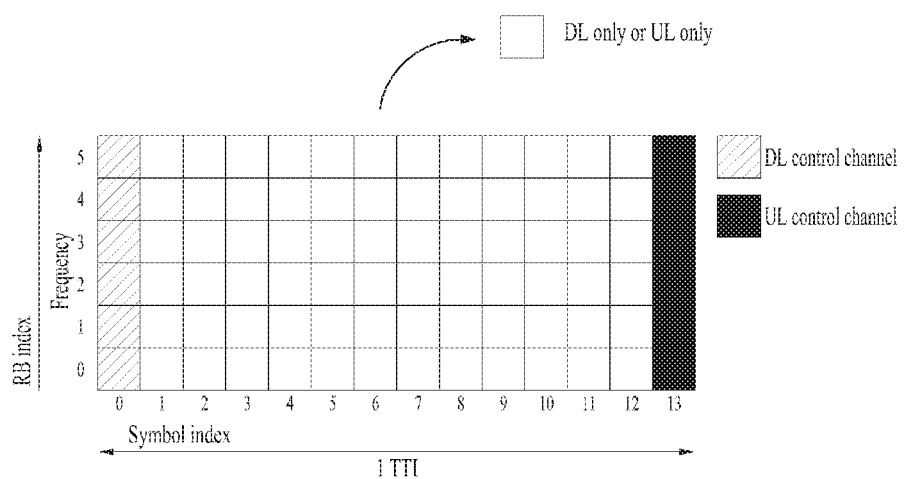
FIG. 5 is a reference diagram for explaining a self-contained slot structure in an NR system.

FIG. 5 is a diagram showing a self-contained slot structure applicable to the present disclosure.

In FIG. 5, the hatched area (e.g., symbol index=0) represents a downlink control region, and the black area (e.g., symbol index=13) represents an uplink control region. The other area (e.g., symbol index=1 to 12) may be used for downlink data transmission or uplink data transmission.

According to this structure, a BS and a UE may sequentially perform DL transmission and UL transmission within one slot, and may transmit/receive DL data and transmit/receive UL ACK/NACK for the same within the one slot. As a result, such a structure may reduce the time taken until the data is retransmitted when a data transmission error occurs, thereby minimizing the delay in the final data transmission.

In this self-contained slot structure, a time gap having a certain time length is needed for the BS and the UE to switch from a transmission mode to a reception mode or to switch from the reception mode to the transmission mode. To this end, some OFDM symbols at the time for switching from DL to UL in the self-contained slot structure may be configured as a guard period (GP).

While the self-contained slot structure has been described as including both the DL control region and the UL control region, such control regions may be selectively included in the self-contained slot structure. In other words, the self-contained slot structure according to the present disclosure may include both the DL control region and the UL control region as in the case of FIG. 5 or may include only one of the DL control region and the UL control region.

For example, slots may have various slot formats. Here, the OFDM symbols of each slot may be classified into Downlink (denoted as "D"), Flexible (denoted as "X"), and Uplink (denoted as "U").

Accordingly, in a DL slot, the UE may assume that DL transmission occurs only on "D" and "X" symbols. Similarly, in a UL slot, the UE may assume that UL transmission occurs only on the "U" and "X" symbols.

Hereinafter, analog beamforming will be described.

In a millimeter wave (mmW) band, the wavelength is short, and thus multiple antenna elements may be installed in the same area. That is, in the 30 GHz band, the wavelength is 1 cm, and thus a total of 100 antenna elements may be installed on a 5 cm*5 cm panel when arranged in a 2-dimension array at intervals of 0.5 lambda (wavelength). Accordingly, in mmW, multiple antenna elements may be used to increase beamforming (BF) gain to enhance the coverage or increase throughput.

Here, each antenna element may include a transceiver unit (TXRU) such that transmit power and phase may be adjusted for each antenna element. Thus, each antenna element may perform independent beamforming for each frequency resource.

However, installing the TXRU on all 100 antenna elements may be ineffective in terms of price. Therefore, a method of mapping a plurality of antenna elements to one TXRU and adjusting the beam direction with an analog phase shifter is under consideration. In this analog beamforming scheme, it is difficult to perform frequency-selective beamforming because only one beam direction is allowed to be generated over the full band.

To address this issue, as an intermediate form between digital BF and analog BF, hybrid BF with B TXRUs, which are fewer than Q antenna elements, may be considered. In this case, the number of directions of beams that can be transmitted at the same time is limited to B or less, which depends on how the B TXRUs are connected to Q antenna elements.

Figure 6:
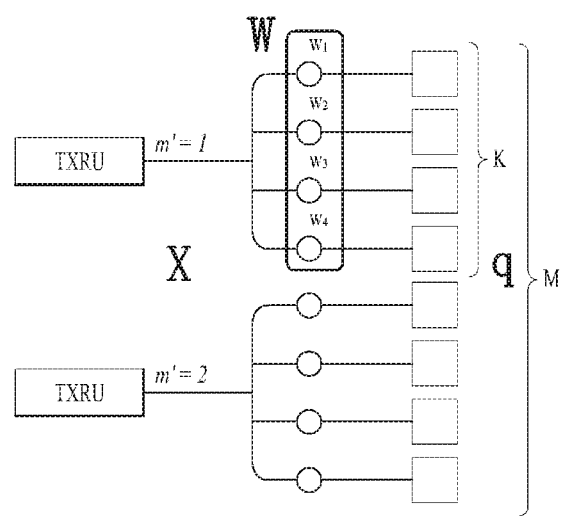
FIGS. 6 and 7 are reference diagrams for explaining methods for connecting transceiver units (TXRUs) to antenna elements.
Figure 7:
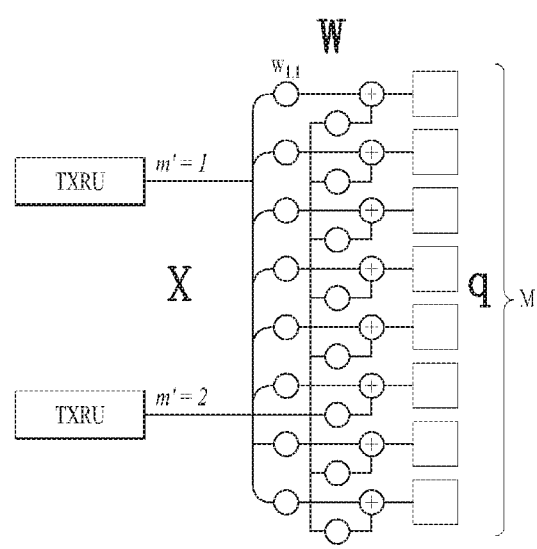

FIGS. 6 and 7 are diagrams illustrating representative methods for connecting TXRUs to antenna elements. Here, the TXRU virtualization model represents the relationship between the output signals of the TXRUs and the output signals of the antenna elements.

FIG. 6 is a diagram illustrating a method for connecting TXRUs to sub-arrays. In the case of FIG. 6, an antenna element is connected to only one TXRU.

FIG. 7 is a diagram illustrating a method for connecting TXRUs to all antenna elements. In the case of FIG. 7, an antenna element is connected to all TXRUs. In this case, a separate adder is needed to connect the antenna element to all TXRUs, as shown in FIG. 7.

In FIGS. 6 and 7, W denotes a phase vector multiplied by an analog phase shifter. That is, W is a main parameter that determines the direction of analog BF. Here, mapping between the CSI-RS antenna ports and the TXRUs may be 1:1 or 1-to-many mapping.

According to the configuration of FIG. 6, it is difficult to focus beamforming, but the entire antennas may be configured at a low cost.

According to the configuration of FIG. 7, it is easy to focus beamforming. However, since the TXRUs are connected to all antenna elements, the total cost may increase.

When multiple antennas are used in the NR system to which the present disclosure is applicable, the hybrid beamforming technique combining digital beamforming and analog beamforming may be applied. Here, the analog beamforming (or radio frequency (RF) beamforming) refers to an operation of performing precoding (or combining) by the RF terminal. In hybrid beamforming, the baseband terminal and RF terminal perform precoding (or combining), respectively. Accordingly, the number of RF chains and digital-to-analog (D/A) (or analog-to-digital (A/D)) converters may be reduced, and performance similar to that of digital beamforming may be obtained.

For simplicity, the hybrid BF structure may be represented by N transceiver units (TXRUs) and M physical antennas. In this case, digital BF for L data layers to be transmitted by the transmitting terminal may be represented by an N*L (N by L) matrix. Thereafter, N converted digital signals are converted into analog signals through the TXRUs, and analog BF, which may be represented by an M*N (M by N) matrix, is applied to the signals obtained through the conversion.

Figure 8:
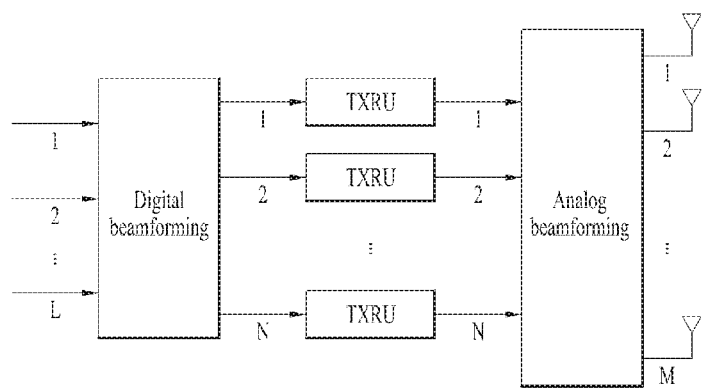
FIG. 8 is a reference diagram for explaining hybrid beamforming.

FIG. 8 is a schematic diagram illustrating a hybrid BF structure from the perspective of TXRUs and physical antennas. In FIG. 8, the number of digital beams is L and the number of analog beams is N.

Additionally, in the NR system, designing a BS to change analog BF on a symbol-by-symbol basis to support more efficient beamforming for a UE located in a specific area is under consideration. Further, in the NR system according to the present disclosure, introducing multiple antenna panels to which independent hybrid beamforming is applicable when each antenna panel is defined by N TXRUs and M RF antennas as shown in FIG. 8 is also under consideration.

When a BS uses multiple analog beams as described above, analog beams suitable for signal reception may differ among the UEs. Accordingly, in the NR system to which the present disclosure is applicable, a beam sweeping operation by which a BS applies a different analog beam on each symbol in a specific subframe (SF) to transmit a signal (at least a synchronization signal, system information, and paging) to allow every UE to have a reception occasion is under consideration.

In addition, supporting semi-persistent CSI reporting as well as the existing periodic/non-periodic CSI reporting is considered in the NR system. Semi-persistent CSI reporting may be activated or deactivated.

For CSI reporting, Type I feedback and Type II feedback are supported. Type II feedback is composed of categories 1, 2, and/or 3, and combining each of the categories with linear combination codebook-based precoder feedback, covariance matrix feedback, or hybrid CSI feedback, that is, combining category 1 or 2 with CSI feedback such as the LTE class B type is under consideration.

Regarding Type I and Type II feedbacks, subband-wise CSI feedback may be supported along with partial band feedback and/or wideband feedback, and beam-related feedback may also be included. For CSI reporting for each component carrier, at least the following three different frequency granularities may be supported:
  wideband CSI;
  partial band CSI; and
  subband CSI.

In addition, the following combinations may be configured regarding CSI-RS transmission and CSI reporting.

TABLE 8

| CSI-RS configuration | Periodic CSI Reporting | Semi-Persistent CSI Reporting | Aperiodic CSI Reporting |
| --- | --- | --- | --- |
| Periodic CSI-RS | No dynamic triggering/ activation | For reporting on PUCCH, the UE receives an activation command (MAC CE); for reporting on PUSCH, the UE receives triggering on DCI | Triggered by DCI; additionally, activation command (MAC CE) |
| Semi-Persistent CSI-RS | Not Supported | For reporting on PUCCH, the UE receives an activation command (MAC CE); for reporting on PUSCH, the UE receives triggering on DCI | Triggered by DCI; additionally, activation command (MAC CE) |
| Aperiodic CSI-RS | Not Supported | Not Supported | Triggered by DCI; additionally, activation command (MAC CE) |

In the conventional communication system, in order for a BS to receive channel quality information from UEs, the UEs first measure a DL signal transmitted from the BS (evolved NodeB (eNB) or next generation NodeB (gNB)) and report the measured channel quality information in response to the signal by indexing a value mapped to a determined quantization level. The conventional technology may result in increase of the overall uplink overhead as a very large number of UEs will perform communication in the 5G communication system or future technology. A traffic situation considered in the NR and 5G communication systems supports communication between a large number of UEs, and significantly increases overhead for feedback information. Accordingly, studies need to be conducted to reduce the overhead. In addition, as a method for supporting reliable communication in multicasting and broadcasting as well as a service dedicated to UEs, feedback information provided to improve reliability and a procedure supporting the same need to be considered. In particular, in order to allow the service to be provided for all UEs in an area where multicast/broadcast is activated, detecting a UE having the worst channel and operating multicast/broadcast based thereon are considered. The present disclosure proposes a method for reducing feedback overhead and finding the worst/best channel through a specific type of signaling from a UE and a BS.

In the basic communication system, feedback information may be considered in order to find a UE having the best channel that maximizes throughput in terms of resource allocation, or resource allocation may be performed considering a channel state from the perspective of fairness. On the other hand, feedback information for finding a UE having the worst channel to maintain communication of UEs even in poor coverage such as a cell edge is an important consideration.

In consideration of CQI reporting of the conventional technology, all UEs should report indexes for channel quality (e.g., 16 levels in LTE) to the BS. In this regard, the only method to reduce the feedback overhead may be for the BS and the UE to reduce the levels of information transmitted through specific signaling. To this end, the BS may set one threshold and signal the same to the UE. Here, the threshold may be set UE-specifically, cell-specifically, or group-specifically, or may be set for the UE through higher layer signaling (e.g., RRC or MAC CE). For a cell of low density or multimedia broadcast multicast services (MBMS), the threshold may be cell group-specifically set. The threshold may be shared between BSs through a backhaul or may be determined at a mobility management entity (MME)/multi-cell/multicast coordination entity (MCE) level and transmitted to a BS. The UE may divide two disjoint subsets (i.e., subsets that have no elements in common) according to the threshold instead of an existing CQI level and indicate only one of the subsets, and may transmit only information of fewer levels.

Figure 9:
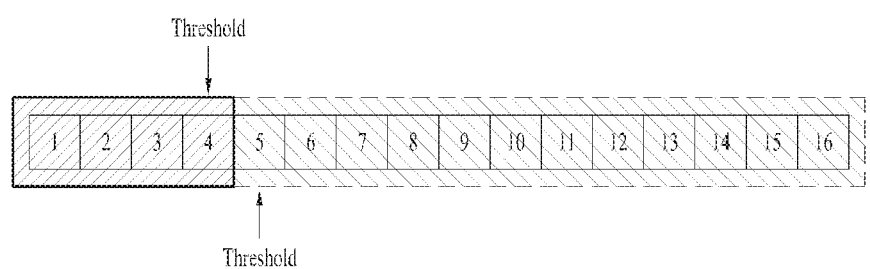
FIG. 9 shows channel quality-related indexing of an interactive method using a threshold.

For example, as shown in FIG. 9, when the existing 16 CQI levels are assumed and segmentation by two level disjoints based on a threshold $\lambda \in \{1, \ldots, 16\}$ transmitted from the BS is assumed, two subsets divided by the threshold may be considered (Subset 1: CQI $\in \{1, \ldots, \lambda\}$, Subset 2: CQI $\in \{\lambda+1, \ldots 16\}$.

In consideration of on/off signaling used in general interactive communication, the UE express subset 1 and subset 2 using 1 bit (on/off) based on the threshold transmitted by the BS. For example, subset 1 and subset 2 may be encoded into 0 and 1 in indexing the best channel. Subset 1 and subset 2 may be encoded into 1 and 0 in indexing the worst channel. The UE may transmit 1 bit for 0 and 1 for the encoded subsets. A case where only a UE encoding 1 performs the transmission operation may be considered. This is determined by an operational procedure of the BS and the UE. The procedure will be briefly described below.

Case 1) The BS intends to find the best channel value:
When a threshold is triggered to identify the best channel, the UEs may measure a channel and may either send 1 bit (1) to the BS as a response if the measured value is greater than or equal to the threshold (e.g., $\lambda_1$=5 in FIG. 9), or skip sending a response if the measured value is less than the threshold;
Upon receiving responses from multiple UEs, the BS may reset the threshold to a greater value ($\lambda_1$>5) to find the best channel value, transmit the same to the UEs, and then repeat the operation of checking the responses from the UEs to find the best channel value.

Case 2) The BS intends to find the worst channel:
When a threshold is triggered to identify the worst channel, the UEs may measure the channel and may either send 1 bit (1) to the BS as a response if the measured value is less than or equal to the threshold (e.g., $\lambda_1$=4 in FIG. 9), or skip sending a response if the measured value is greater than the threshold;
Upon receiving responses from multiple UEs, the BS may reset the threshold to a lower value ($\lambda_2$<4) to find the worst channel value, transmit the same to the UEs, and then repeat the operation of checking the responses from the UEs to find the worst channel value.

The interactive communication technique as described above may reduce overhead compared to the conventional scheme, in which the number of hand-shaking between the UE and the BS is determined depending on a situation to transmit CQI, but setting of multiple thresholds and a certain processing time need to be considered in determining the best/worst channel. In order to compensate for drawbacks of the conventional technology, the present disclosure proposes disjoint subset segmentation of a transmitted CQI level based on a threshold and introduces a technique for reducing feedback overhead and ensuring fine resolution.

Two Level Disjoint Segmentation

Figure 10:
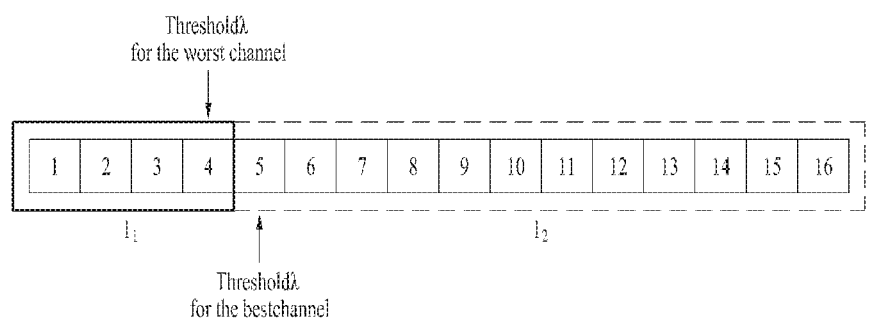
FIGS. 10, 11 and 12 illustrate channel quality-related indexing according to two-level disjoint segmentation and a threshold.

As shown in FIG. 10, the UE receives one threshold from the BS. The UE follows the procedure described below. In general, the length of a disjoint subset does not need to take the form of $2^n$ ($n \in \{1, 2, \ldots\}$). However, in order to actually express a subset level, transmission of $\lceil \log_2 l_i \rceil$ bits is needed. Accordingly, $l_i$ is generally considered as $l_i \in \{2^1, 2^2, 2^3, \ldots\}$ for an improved mechanism.

Figure 11:
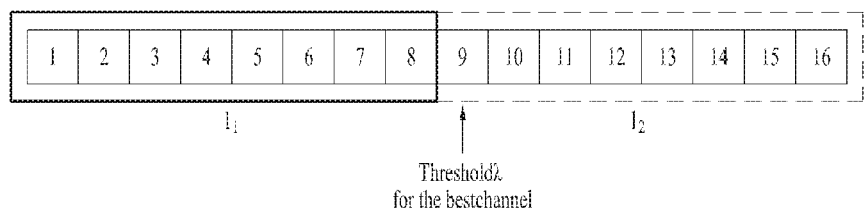

Case 1) When the BS intends to find the best channel value (second subset), suppose that the threshold for finding the best channel is $\lambda$=9 in FIG. 11.

When the threshold is triggered to identify the best channel, UEs measure a channel. When the measured value is greater than or equal to the threshold (e.g., $\lambda$=9 in FIG. 11), the UEs encode the value belonging to the subset in $\lceil \log_2 l_2 \rceil$ bits and send the same to the BS as a response. When the measured value is less than the threshold, the UEs encode the value with $\lambda$=9, which is the minimum value and indicates a boundary of the subset. For example, the UEs may operate as follows.

When the measured value is among 1, . . . , 8, the UEs may encode the value into 000, which is the minimum value of subset 2, because the measured value is less than the threshold, 9.

When the measured value is 9, the UEs may encode the value into 000, which corresponds to the first level of subset 2 because the measured value corresponds to the threshold, 9.

When the measured value is 10, the UEs may encode the value into 001, which corresponds to the second level of subset 2, because the measured value is greater than the threshold, 9.

When the measured value is 11, the UEs may encode the value into 010, which corresponds to the third level of subset 2, because the measured value is greater than the threshold, 9.

When the measured value is 12, the UEs may encode the value into 011, which corresponds to the fourth level of subset 2, because the measured value is greater than the threshold, 9.

When the measured value is 13, the UEs may encode the value into 100, which corresponds to the fifth level of subset 2, because the measured value is greater than the threshold, 9.

When the measured value is 14, the UEs may encode the value into 101, which corresponds to the sixth level of subset 2, because the measured value is greater than the threshold, 9.

When the measured value is 15, the UEs may encode the value into 110, which corresponds to the seventh level of subset 2, because the measured value is greater than the threshold, 9.

When the measured value is 16, the UEs may encode the value into 111, which corresponds to the eighth level of subset 2, because the measured value is greater than the threshold, 9.

Upon receiving responses corresponding to the measured values from multiple UEs, the BS may decode each response to find the best channel value. For example, the BS may operate as follows.

When the decoded value is 000, it corresponds to the first level of subset 2, and accordingly the BS may recognize that the measured value is a CQI value is less than or equal to 9.

When the decoded value is 001, it corresponds to the second level of subset 2, and accordingly the BS may recognize that the measured value is CQI 10.

When the decoded value is 010, it corresponds to the third level of subset 2, and accordingly the BS may recognize that the measured value is CQI 11.

When the decoded value is 011, it corresponds to the fourth level of subset 2, and accordingly the BS may recognize that the measured value is CQI 12.

When the decoded value is 100, it corresponds to the fifth level of subset 2, and accordingly the BS may recognize that the measured value is CQI 13.

When the decoded value is 101, it corresponds to the sixth level of subset 2, and accordingly the BS may recognize that the measured value is CQI 14.

When the decoded value is 110, it corresponds to the seventh level of subset 2, and accordingly the BS may recognize that the measured value is CQI 15.

When the decoded value is 111, it corresponds to the eighth level of subset 2, and accordingly the BS may recognize that the measured value is CQI 16.

Figure 12:
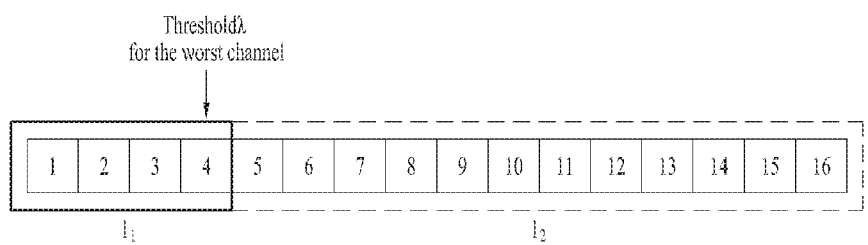

Case 2) When the BS intends to find the worst channel (first subset), suppose that the threshold for finding the worst channel is λ=4 in FIG. 12.

When the threshold is triggered to identify the worst channel, the UEs may measure a channel. When the measured value is less than or equal to the threshold (e.g., λ=4 in FIG. 12), the UEs may encode a value belonging to the subset in $\lceil \log_2 l_1 \rceil$ bits and send the same to the BS as a response. When the measured value is greater than the threshold, the UEs may encode the value with λ=4, which is the maximum value and indicates the boundary of the subset. For example, the UEs may operate as follows.

When the measured value is 1, the UEs may encode the value into 00, which corresponds to the first level of subset 1, because the measured value is less than the threshold, 4.

When the measured value is 2, the UEs may encode the value into 01, which corresponds to the second level of subset 1, because the measured value is less than the threshold, 4.

When the measured value is 3, the UEs may encode the value into 10, which corresponds to the third level of subset 1, because the measured value is less than the threshold, 4.

When the measured value is 4, the UEs may encode the value into 11, which corresponds to the fourth level of subset 1, because the measured value is equal to the threshold, 4.

When the measured value is 5 to 16, the UEs may encode the value into 11, which is the boundary of subset 1 corresponding to the maximum value, because the measured value is greater than the threshold, 4.

The BS may receive responses from multiple UEs and decode the received information to identify the worst channel value.

When the decoded value is 00, it corresponds to the first level of subset 1, and accordingly the BS may recognize that the measured value is CQI 1.

When the decoded value is 01, it corresponds to the second level of subset 1, and accordingly the BS may recognize that the measured value is CQI 2.

When the decoded value is 10, it corresponds to the third level of subset 1, and accordingly the BS may recognize that the measured value is CQI 3.

When the decoded value is 11, it corresponds to the fourth level of subset 1 or subset 2, and accordingly the BS may recognize that the measured value is greater than or equal to CQI 4.

The above-described example is about a procedure limited to a case where the BS and the UEs know the fixed transmission bits by the threshold.

Additionally, the threshold may be set by RRC signaling. The same may be applied even to a case where the size of the CQI reported from a higher layer and single/multiple threshold(s) can be indicated through a CQI restriction bitmap using a method such as the conventional codebook subset restriction.

In addition, in consideration of the capability of the BS to detect the length of information received from the UE, disjoint segmentation may be generally extended to multiple subsets of two or more levels.

Disjoint Segmentation of Multiple Levels

Figure 13:
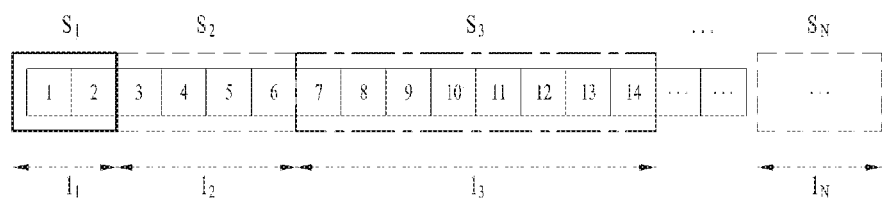
FIGS. 13 and 14 illustrate channel quality-related indexing according to multi-level disjoint segmentation.

Disjoint segmentation as shown in FIG. 13 is defined for all indexes (sample space $\Omega$) representing CQI levels.

Here, assuming that $S_i$ is a subset of one $\Omega$, for $i \neq j$, $$\bigcup_i S_i = \Omega, \text{ and}$$

$$S_i \cap S_j = \emptyset.$$

That is, since the part of $\Omega$ is a set of mutually exclusive subsets of $\Omega$, the union of the subsets is $\Omega$.

When the length for each subset (the number of CQI indexes corresponding to a subset) is set as $l_i$, $$l_i \neq l_j \text{ for } i \neq j, \text{ and}$$

$$\lceil \log_2 l_i \rceil \neq \lceil \log_2 l_j \rceil \text{ for } i \neq j.$$

Generally, $l_i$ is not required to be $l_i \in \{2^1, 2^2, 2^3, \ldots\}$, and these values are determined based on the information received from the BS. In this regard, a procedure will be described.

<Encoding at the UE>

The UE may check the position of the measured CQI value among the disjoint subsets. When the value corresponds to the i-th segment, the UE may express the measured value in $\lceil \log_2 l_i \rceil$ bits and transmit the same to the BS.

<Decoding at the BS>

Upon receiving the $\lceil \log_2 l_i \rceil$ bit information from the UE, the BS may distinguish the corresponding subset from the other subsets based on the length of the received information. Since the subsets are set to different lengths ($l_i \neq l_j$ for $i \neq j$), the corresponding subset may be distinguished. It may be recognized that the received information is the i-th subset. The CQI may be identified by the value received in $\lceil \log_2 l_i \rceil$ bits.

Example

Step 1: The BS performs disjoint segmentation for the entire report levels transmitted from the UE for feedback information. The information transmitted from the BS to the UEs to trigger a feedback mechanism includes disjoint segmentation information configured by the BS, which is carried in system information or DL control information and transmitted to the UE. In order to include the disjoint segmentation information, an index is transmitted using a predefined table, or multiple thresholds (differential offset) are configured to deliver disjoint segmentation related information to the UE.

Step 2: (Encoding) When the UEs determine that the feedback mechanism is triggered based on the information received from the BS, each UE may encode the measured value (e.g., CQI) and transmit the same to the BS as follows. The UE may first check which subset corresponds to the measured value among the disjoint subsets. If the subset corresponds to the i-th segment (the second segment (subset) in FIG. 14), the UE may express the measured value in $\lceil \log_2 l_i \rceil$ bits (as "11" in the example of FIG. 14) and may transmit the same to the BS.

Figure 14:
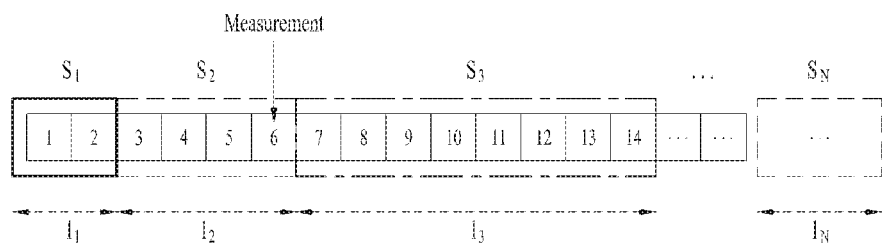

Step 3: (Decoding) When the BS receives the $\lceil \log_2 l_i \rceil$ bit information from the UE, it identifies the position of the corresponding subset based on the length of the received information. Since each segment or subset is set to a different length ($l_i \neq l_j$ for $i \neq j$), the position of the corresponding subset may be identified. In the example of FIG. 14, the length of the received information is 2 bits, and therefore the BS may recognize that the corresponding subset is the second subset, which is a subset representing four levels. Since the information received from the UE corresponds to the second subset and indicates "11", the BS may recognize that the CQI corresponds to 6.

Although the present disclosure basically describes a method of reducing feedbacks for CQI, the same method may be used for UEs according to a measurement type. For example, as targets about which UEs measure BS signals, basic channel quality-related metrics (e.g., reference signal received power (RSRP), reference signal received quality (RSRQ), signal to interference & noise ratio (SINR), reference signal (RS)-SINR, received signal strength indicator (RSSI), etc.) and beam-specific metrics may be applied. Thus, the best/worst channel report in the above-described proposal is not limited to CQI, but may be extended to RSRP, RSRQ, RS-SINR, SINR, RSSI, and the like, which are metrics indicating the channel quality or beam quality.

In addition, even when the BS cannot detect the length of the information received from a UE, reporting may be performed based on multiple subsets as a method of providing disjoint subset information by RRC signaling. As the method by RRC signaling, disjoint subset information may be delivered through a CQI index group wise bitmap. For example, when there are six CQI index groups in total as shown in FIG. 15, the BS may signal to the UE a CQI index group (one of (a) to (f) in FIG. 15) that is to be used, using a 3-bit bitmap. In FIG. 15(a), the group may be indicated by '000'. In FIG. 15(b), the group may be indicated by '001'. In FIG. 15(f), the group may be indicated by '101'.

Figure 16:
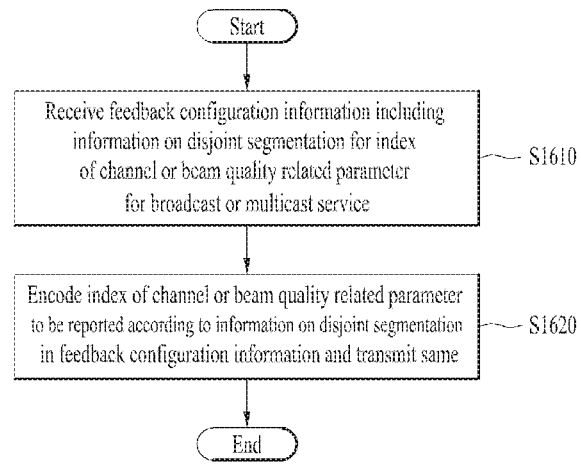
FIGS. 16 and 17 are flowcharts illustrating operations according to example(s) of the present disclosure.

In reporting a CQI index according to channel measurement after a CQI index group is configured as described above, the UE may select at least one CQI index based on the configured CQI index group and report the same to the BS. In the case of FIG. 15(a), 16 CQI indexes may be divided into 4 subsets, and a 4-bit bitmap may be used for a subset that is to be used. For example, in FIG. 15(a), when CQIs 3 to 6 and CQIs 15 to 16 are to be reported, the UE may specify CQIs 3 to 6 and CQIs 15 and 16 for the BS using '0101' (4 bits), and use 2 bits and 1 bit to indicate a CQI index in each subset. Thus, the UE may report 2 CQI indexes to the BS using 7 bits in total. Thus, the bits required for CQI index reporting are 1 bit fewer than the conventional case where reporting two CQI indexes requires 4 bits for each CQI index (and thus 4*2=8 bits for 2 CQI indexes).

The bitmap size/threshold may depend on the reported UE capability. When a CQI table for ultra reliable and low latency communication (URLLC) is newly designed in NR to use all the 16 states, the bit size may be the same. Examples of suitable grouping for each service on the assumption that a CQI table of 16 levels include conventional grouping into $2^n$ and grouping in the same modulation order.

Through a technique for providing subset information by RRC signaling based on that the bit-width of CQI is variable, the BS recognizes the subset information transmitted by RRC signaling even if the amount of information that is fed back is not known. However, an increase in overhead is expected at the RRC level.

FIG. 16 illustrates an operation of a processor chip, a processor, or a UE including or having the same according to examples of the present disclosure. In the following description, a processor chip, a processor, or a UE including or having the same will be referred to simply as a "feedback device."

The feedback device may receive feedback configuration information including information on disjoint segmentation for an index of a channel or beam quality related parameter for a broadcast or multicast service from a BS or a system (S1610). The feedback device may encode the index of a channel or beam quality related parameter to be reported and transmit the same to the BS or the system according to the information on the disjoint segmentation in the feedback configuration information (S1620).

The disjoint segmentation may include multiple subsets that have different lengths while not overlapping with each other, and the index of the channel or beam quality related parameter transmitted to the BS may indicate a specific value in one subset among the multiple subsets.

In addition, the index of the channel or beam quality-related parameter for each of the multiple subsets may be indicated by a different number of bits. The number of bits indicating the encoded indexes may be smaller than the number of bits for indicating all indexes of the channel or beam quality related parameter.

Figure 17:
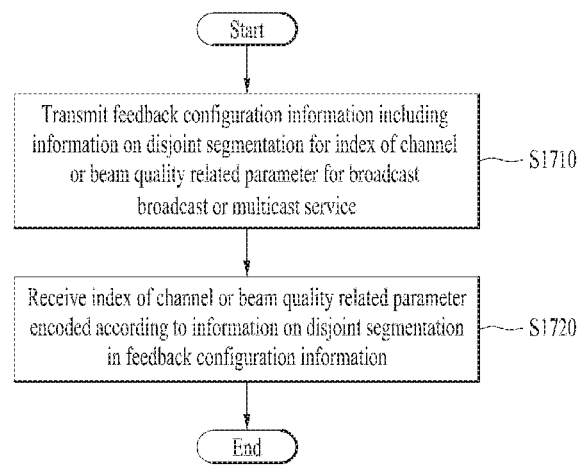

FIG. 17 illustrates the operation of a processor chip, a processor, or a BS including or having the same in accordance with examples of the present disclosure. In the following description, a processor chip, a processor, or a UE including or having the same will be referred to simply as a "feedback receiving device."

The feedback receiving device may transmit feedback configuration information including information on disjoint segmentation for an index of a channel or beam quality related parameter for a broadcast or multicast service to a processor chip, a processor, or a UE including or having the same (S1710). In addition, the feedback receiving device may receive, from the processor chip, the processor, or the UE, the index of the channel or beam quality related parameter encoded according to the information on the disjoint segmentation in the feedback configuration information (S1720). The disjoint segmentation may include multiple subsets that have different lengths while not overlapping with each other, and the index of the channel or beam quality related parameter transmitted to the BS may indicate a specific value in one subset among the multiple subsets.

In addition, an index of the channel or beam quality-related parameter for each of the multiple subsets may be represented by a different number of bits.

The number of bits indicating the encoded indexes may be smaller than the number of bits for indicating all indexes of the channel or beam quality related parameter.

Figure 18:
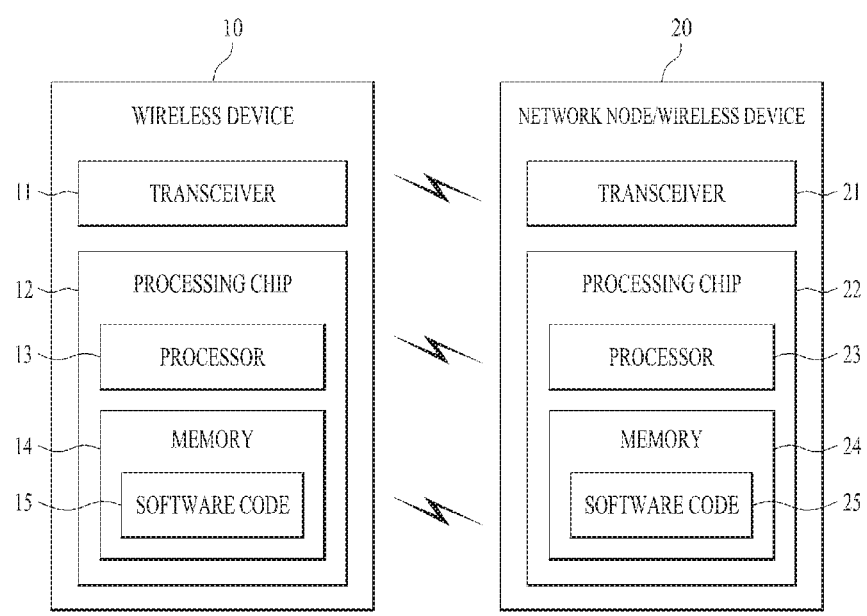
FIG. 18 is a block diagram of devices for implementing example(s) of the present disclosure.

FIG. 18 is a block diagram illustrating an example of communication between a wireless device 10 and a network node 20.

In the present disclosure, the wireless device 10 or the network node 20 includes a transceiver 11, 21 for communication with one or more other wireless devices, network nodes, and/or other elements of the network. The transceiver 11, 21 may include one or more transmitters, one or more receivers, and/or one or more communication interfaces.

The transceiver 11, 21 may further include one or more antennas. According to an example of the present disclosure, the antennas may function to transmit a signal processed by the transceiver 11, 21 to the outside under control of the processing chip 12, 22 and to receive a radio signal from the outside and deliver the signal to the processing chip 12, 22. The antenna is also called an antenna port. Each antenna may correspond to one physical antenna or may be configured by a combination of more than one physical antenna element. The signal transmitted through from each antenna may no longer be resolved by the wireless device 10 or the network node 20. A reference signal (RS) transmitted according to the corresponding antenna defines the antenna from the perspective of the wireless device 10 or the network node 20, and enables the wireless device 10 or the network node 20 to perform channel estimation for the antenna regardless of whether the channel is a single radio channel from one physical antenna or is a composite channel from multiple physical antenna elements including the antenna. That is, the antenna is defined such that a channel carrying a symbol on the antenna may be derived from the channel carrying another symbol on the same antenna. A transceiver supporting a multi-input multi-output (MIMO) function that transmits and receives data using multiple antennas may be connected to two or more antennas.

In the present disclosure, the transceivers 11 and 21 may support reception beamforming and transmission beamforming. For example, in the present disclosure, the transceivers 11 and 21 may be configured to perform the functions illustrated in FIGS. 5 to 8.

The wireless device 10 or the network node 20 further includes a processing chips 12, 22. The processing chip 12, 22 may include at least one processor, such as the processors 13 and 23, and at least one memory device, such as the memories 14 and 24.

The processing chips 12, 22 may control at least one of the methods and/or processes described herein. In other words, the processing chips 12 and 22 may be configured to perform at least one example described herein.

The processor 13, 23 includes at least one processor configured to perform the functions of the wireless device 10 or the network node 20 described herein.

For example, the one or more processors may control the one or more transceivers 11 and 21 of FIG. 28 to transmit and receive information.

In addition, the processor 13, 23 included in the processing chip 12, 22 may perform predetermined encoding on signals and/or data to be transmitted to the outside of the wireless device 10 or the network node 20 after predetermined modulation (modulation), and transmit the same to the transceiver 11, 21. For example, the processors 13 and 23 convert a data stream to be transmitted into K layers through demultiplexing and channel encoding, scrambling, and modulation. The coded data stream is also referred to as a codeword, and is equivalent to a transport block, which is a data block provided by the MAC layer. One transport block (TB) is encoded into one codeword, and each codeword is transmitted to the receiving device in the form of one or more layers. For frequency upconversion, the transceiver 11, 21 may include an oscillator. The transceiver 11, 21 may include Nt transmit antennas (where Nt is a positive integer greater than or equal to 1).

Further, the processing chip 12, 22 includes a memory 14, 24 configured to store data, programmable software code, and/or other information for implementing the examples described herein.

In other words, in an example according to the present specification, when the memory 14, 24 is executed by at least one processor, such as the processors 13 and 23, it may cause the processor 13, 23 may store software code 15, 25 containing instructions for causing the processor 13, 23 to perform some or all of the processes controlled by processor 13, 23 of FIG. 18, or for performing the examples described herein based on FIGS. 1 to 17.

Specifically, the processing chip 12 of the wireless device 10 according to an example of the present disclosure may receive, from a BS, feedback configuration information including information on disjoint segmentation for an index of a channel or beam quality related parameter for a broadcast or multicast service, and may encode an index of the channel or beam quality related parameter to be reported according to the information on the disjoint segmentation in the feedback configuration information and transmit the same to the BS. The disjoint segmentation may include multiple subsets that have different lengths while not overlapping with each other, and the index of the channel or beam quality related parameter transmitted to the BS may indicate a specific value in one subset among the multiple subsets.

In addition, the index of the channel or beam quality-related parameter for each of the multiple subsets may be represented by a different number of bits.

The number of bits indicating the encoded index may be smaller than the number of bits for indicating all indexes of the channel or beam quality related parameter.

In addition, the processing chip 22 of the network node 20 according to an example of the present disclosure may feedback configuration information including information on disjoint segmentation for an index of a channel or beam quality related parameter for a broadcast or multicast service to a UE, and receive an index of a channel or beam quality-related parameter, encoded according to the information on the disjoint segmentation of the feedback configuration information, from the UE. The disjoint segmentation may include multiple subsets that have different lengths while not overlapping with each other, and the index of the channel or beam quality related parameter transmitted to the BS may indicate a specific value in one subset among the multiple subsets.

In addition, the index of the channel or beam quality-related parameter for each of the multiple subsets may be indicated by a different number of bits.

The number of bits indicating the encoded indexes may be smaller than the number of bits indicating the entire indexes of the channel or beam quality related parameter.

The examples described above are combined by the components and features of the present disclosure in a predetermined form. Each component or feature should be considered optional unless stated otherwise. Each component or feature may be implemented without being combined with other components or features. It is also possible to configure an example of the present disclosure by combining some components and/or features. The order of the operations described in the examples of the present disclosure may be changed. Some components or features of one example may be included in other examples, or may be replaced with corresponding components or features of other examples. It is apparent to those skilled in the art that claims that are not explicitly cited in each other in the appended claims may be combined to configure an embodiment of the present disclosure or included in a new claim by a subsequent amendment after the application is filed.

In this document, a specific operation described as being performed by a BS may be performed by an upper node in some cases. That is, it is apparent that various operations performed for communication with a UE in a network composed of multiple network nodes including a BS may be performed by the BS or network nodes other than the BS. The term "base station" may be replaced by terms such as "fixed station," "Node B," "eNode B (eNB)," "ng-eNB (next generation eNB)," "gNB (next generation NodeB)," "access point," or the like.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

It is apparent to those skilled in the art that the present disclosure can be embodied in other specific forms without departing from the spirit and essential characteristics of the disclosure. Accordingly, the above detailed description should be considered in all respects as illustrative and not restrictive. The scope of the present disclosure should be determined by rational interpretation of the appended claims, and all changes within the equivalent scope of the present disclosure are included in the scope of the present disclosure.

INDUSTRIAL APPLICABILITY

The present disclosure is applicable to wireless communication devices such as a terminal, a relay, and a base station.

The invention claimed is:

1. A method for feedback of channel quality information in a wireless communication system, the method being performed by a terminal and comprising:
receiving, from a base station, feedback configuration information including information on disjoint segmentation for an index of a parameter related to channel or beam quality for a broadcast or multicast service; and
transmitting, to the base station, by encoding an index of a parameter related to channel or beam quality to be reported, according to the information on the disjoint segmentation in the feedback configuration information,
wherein the disjoint segmentation comprises a plurality of subsets having different lengths while not overlapping with each other, and the index of the parameter related to the channel or the beam quality transmitted to the base station indicates a specific value in one of the plurality of subsets.

2. The method of claim 1, wherein an index of a parameter related to channel or beam quality for each of the plurality of subsets is represented by a different number of bits.

3. The method of claim 1, wherein the number of bits indicating the encoded index is smaller than the number of bits for indicating all indexes of a parameter related to channel or beam quality.

4. A method for feedback of channel quality information in a wireless communication system, the method being performed by a base station and comprising:
transmitting, to a terminal, feedback configuration information including information on disjoint segmentation for an index of a parameter related to channel or beam quality for a broadcast or multicast service; and
receiving, from the terminal, an index of a parameter related to channel or beam quality encoded according to the information on the disjoint segmentation in the feedback configuration information,
wherein the disjoint segmentation comprises a plurality of subsets having different lengths while not overlapping with each other, and the index of the parameter related to the channel or the beam quality transmitted to the base station indicates a specific value in one of the plurality of subsets.

5. The method of claim 4, wherein an index of a parameter related to channel or beam quality for each of the plurality of subsets is represented by a different number of bits.

6. The method of claim 4, wherein the number of bits indicating the encoded index is smaller than the number of bits for indicating all indexes of a parameter related to channel or beam quality.

7. A terminal for feedback of channel quality information in a wireless communication system, the terminal comprising:
a transmitter and a receiver; and
a processor configured to control the transmitter and receiver,
wherein the processor is configured to:
receive, from a base station, feedback configuration information including information on disjoint segmentation for an index of a parameter related to channel or beam quality for a broadcast or multicast service; and
transmit, to the base station, by encoding an index of a parameter related to channel or beam quality to be reported, according to the information on the disjoint segmentation in the feedback configuration information,
wherein the disjoint segmentation comprises a plurality of subsets having different lengths while not overlapping with each other, and the index of the parameter related to the channel or the beam quality transmitted to the base station indicates a specific value in one of the plurality of subsets.

8. The terminal of claim 7, wherein an index of a parameter related to channel or beam quality for each of the plurality of subsets is represented by a different number of bits.

9. The terminal of claim 7, wherein the number of bits indicating the encoded index is smaller than the number of bits for indicating all indexes of a parameter related to channel or beam quality.

10. The terminal of claim 7, wherein the terminal is capable of communicating with at least one of another terminal, a terminal related to an autonomous driving vehicle, the base station or a network.

11. A base station for feedback of channel quality information in a wireless communication system, the base station comprising:
- a transmitter and a receiver; and
- a processor configured to control the transmitter and receiver,
- wherein the processor is configured to:
- transmit, to a terminal, feedback configuration information including information on disjoint segmentation for an index of a parameter related to channel or beam quality for a broadcast or multicast service; and
- receive, from the terminal, an index of a parameter related to channel or beam quality encoded according to the information on the disjoint segmentation in the feedback configuration information,
- wherein the disjoint segmentation comprises a plurality of subsets having different lengths while not overlapping with each other, and the index of the parameter related to the channel or the beam quality transmitted to the base station indicates a specific value in one of the plurality of subsets.

12. The base station of claim 11, wherein an index of a parameter related to channel or beam quality for each of the plurality of subsets is represented by a different number of bits.

13. The base station of claim 11, wherein the number of bits indicating the encoded index is smaller than the number of bits for indicating all indexes of a parameter related to channel or beam quality.

* * * * *